United States Patent
Agarwal et al.

(10) Patent No.: US 9,953,220 B2
(45) Date of Patent: Apr. 24, 2018

(54) CUTOUT OBJECT MERGE

(71) Applicant: Adobe Systems Incorporated, San Jose, CA (US)

(72) Inventors: Rekha Agarwal, Noida (IN); Amit Mittal, Noida (IN); Naveen Prakash Goel, Noida (IN); Ritesh Agarwal, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 20 days.

(21) Appl. No.: 14/549,383

(22) Filed: Nov. 20, 2014

(65) Prior Publication Data

US 2016/0148428 A1    May 26, 2016

(51) Int. Cl.
*G09G 5/00*      (2006.01)
*G06K 9/00*      (2006.01)
*H04N 5/272*     (2006.01)
*G06T 11/60*     (2006.01)

(52) U.S. Cl.
CPC .......... *G06K 9/00523* (2013.01); *G06T 11/60* (2013.01); *H04N 5/272* (2013.01); *G06K 9/00228* (2013.01)

(58) Field of Classification Search
CPC ........ G06T 19/006; G06T 19/00; F06F 3/011; G02B 27/017; G06F 3/012
USPC ........................................................ 345/633
See application file for complete search history.

(56) References Cited

U.S. PATENT DOCUMENTS

| | | | | |
|---|---|---|---|---|
| 5,867,166 A | * | 2/1999 | Myhrvold | G06T 11/001 345/419 |
| 6,546,188 B1 | * | 4/2003 | Ishii | G11B 27/031 386/280 |
| 6,686,926 B1 | * | 2/2004 | Kaye | G03B 35/16 345/680 |
| 7,855,737 B2 | * | 12/2010 | Petrescu | H04N 5/23219 348/239 |
| 8,150,202 B2 | * | 4/2012 | Mohanty | G06T 5/009 358/3.26 |
| 8,380,005 B1 | * | 2/2013 | Jonsson | G06T 11/60 382/282 |
| 9,131,140 B2 | * | 9/2015 | Nakase | G06F 17/30247 |
| 9,230,339 B2 | * | 1/2016 | Wexler | G06T 7/602 |
| 2011/0123118 A1 | * | 5/2011 | Nayar | G06T 11/60 382/190 |
| 2015/0009359 A1 | * | 1/2015 | Zaheer | H04N 1/6077 348/223.1 |

* cited by examiner

*Primary Examiner* — Ke Xiao
*Assistant Examiner* — Gordon Liu
(74) *Attorney, Agent, or Firm* — Wolfe-SBMC

(57) ABSTRACT

Cutout object merge techniques are described. In one or more embodiments, a cutout object is identified for insertion into a scene. The cutout object may, for instance, be selected from a library of cutout objects, each of which was extracted from an already-captured image. Before capturing an image of the scene, the selected cutout object may be placed in a substantially real-time display of the scene, such as that which is displayed via a camera's view finder. Using an image capturing device, an image of the scene may then be captured. Once an image of the scene is captured, the cutout object and the captured image may be merged to form a composite image that includes the cutout object at a location in the scene specified by the placement.

20 Claims, 8 Drawing Sheets

CUTOUT OBJECT MERGE

BACKGROUND

The capabilities with which mobile devices can be configured have led many users to carry around just a single device capable of performing functions previously performed by multiple different devices. A single mobile device can, for instance, function as a cellular telephone, portable media player, portable gaming console, remote control, garage door opener, flashlight, camera, and so on.

Use of mobile devices as cameras, in particular, has become largely commonplace. The portability that enables mobile devices to fit conveniently in pockets, purses, and the like, also makes them an attractive camera option to carry around for taking pictures at practically any time, e.g., on trips. When on a trip, however, one person in a group of people (or a small subset of the group) is oftentimes designated as, or takes the initiative to be, the group's photographer. By doing so, photographers are often left out of the photographs, e.g., because he or she is behind the camera. Although conventional techniques may enable a user to add photographers back into photographs as part of post-processing, doing so may be time-consuming. Consequently, users may avoid adding photographers back into their photos.

SUMMARY

Cutout object merge techniques are described. In one or more embodiments, a cutout object is identified for insertion into a scene. The cutout object may, for instance, be selected from a library of cutout objects, each of which was extracted from an already-captured image. Before capturing an image of the scene, the selected cutout object may be placed in a substantially real-time display of the scene, such as that which is displayed via a camera's view finder. Using an image capturing device, an image of the scene may then be captured. Once an image of the scene is captured, the cutout object and the captured image may be merged to form a composite image that includes the cutout object at a location in the scene specified by the placement.

In conjunction with placing the cutout object in the substantially real-time display of the scene, a size and visual characteristics of the cutout object may be adjusted. For example, if the cutout object corresponds to a person, then its size may be adjusted so that a height of the cutout object's face matches a face height of people in the scene. Visual characteristics of the cutout object, such as brightness, saturation, color temperature, and so on, may also be adjusted to match visual characteristics of the scene that is to be captured. In one or more embodiments, objects of the scene may be moved in the substantially-real time display to fit the cutout object into the scene. When the scene that is displayed in substantially real-time is captured, such adjustments may be reflected in the composite image that results from merging the cutout object with the captured image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
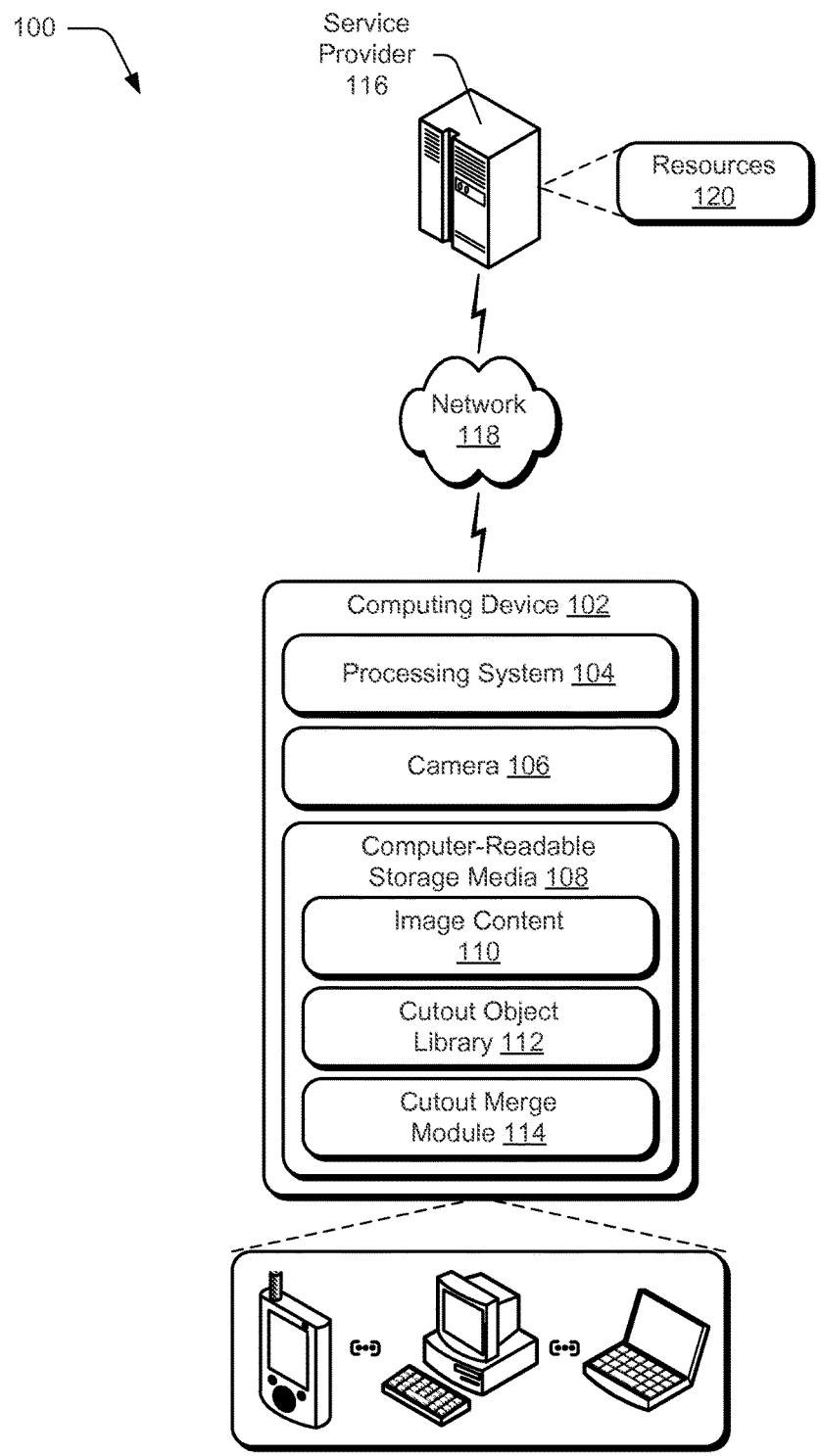
FIG. 1 is an illustration of an environment in an example embodiment that is operable to employ techniques described herein.

When people go on trips, one person in a group (or a small subset of the group) is oftentimes designated as, or takes the initiative to be, the group's photographer. However, photographers are often left out of the photographs, e.g., because they are behind the camera. Although conventional techniques may enable a user to add photographers back into photographs as part of post-processing, doing so may be time-consuming. Due to the time commitment involved with adding photographers back into photos during post-processing, users may be discouraged from doing so, thereby limiting the photos in which photographers are included.

Cutout object merge techniques are described. In one or more embodiments, objects are cutout from already-captured images. By way of example, a person who is designated to be the photographer on a trip may have several photos taken prior to the trip in a variety of different outfits and poses. From each of these photos, the photographer can be extracted (e.g., cutout). Objects that are extracted from already-captured images, like the photographer in this example, may be referred to herein as "cutout objects". Once extracted from already-captured images, cutout objects may be stored for future use, e.g., as part of a cutout object library. A cutout object library may thus include a variety of cutout objects. Continuing with the trip example, the cutout object library may include cutouts of the photographer in each of the different outfits and different poses. It may also include cutouts of other people the photographer would like included in photos taken on the trip, e.g., friends and family who are not able to make the trip.

In general, the cutout objects from the cutout object library may be merged with captured images to form a composite image. In a composite image, a cutout object may be merged into a scene at a position specified by a user. A user may, for instance, drag a cutout object to a specific location in a "substantially real-time" display of the scene or in an already-captured image of the scene. Not only may the user drag the cutout object to a specific location of the "substantially real-time" display or the already-captured image, but the user may also adjust a depth of the cutout object relative to objects in the scene. The cutout object may then be merged at the specified location and depth. Furthermore, when the cutout object is merged, visual characteristics of the cutout object may be adjusted to match visual characteristics of the image with which the cutout object is merged. By way of example, a size of the cutout object may be adjusted to match a size of objects in the scene. Other visual characteristics of the cutout object may also be adjusted to match those of the scene, such as brightness, saturation, color temperature, and so forth.

In one scenario, the cutout object library may be made available in conjunction with a substantially real-time display of a scene, e.g., as part of a user interface that includes a view finder for a camera. By "substantially real-time" it is meant that there is at least some delay (minimally perceptible to the human eye) between a time when light transmitted from the scene reaches an image sensing device (e.g., camera) and a time when the scene is displayed via a user interface. Nonetheless, a camera's view finder may be said to provide a preview of a scene that is to be captured by the camera.

Via the user interface, a cutout object may be identified for insertion into the substantially real-time display of the scene and placed therein. When framing a scene in the view finder, the photographer in the continuing example may select a cutout of him or herself from the library and place the cutout in the scene presented in the view finder. The user interface may enable the photographer to place the cutout in a group of people of which the picture is taken, for example. The photographer may also be able to change a depth of the cutout relative to the people in the scene so that the cutout appears to be in front of or behind them. In any case, the photographer may place the cutout in the scene while it is viewed through the view finder substantially in real-time.

An image of the scene may then be captured. Responsive to capturing an image of the scene, the cutout object may be automatically merged therewith to form a composite image. The composite image may incorporate the cutout object at a location of the scene where it was placed. In the continuing example, the photographer may press a button on the camera to capture an image of the scene once finished framing the scene and placing the cutout. The photographer's cutout may then be automatically merged with the captured image so that the cutout is positioned in the scene as specified by the photographer. In this way, the photographer may be included in photographs of the trip without having to go back and process those photographs to add the photographer.

In another scenario, the cutout object library may be made available in conjunction with an already-captured image of the scene, e.g., as part of a user interface of a photo editing application. Via the user interface, a cutout object may be identified for insertion into the already-captured image and placed therein. The user interface may enable the a user to place the cutout object in a group of people of which the already-captured image was taken, and adjust a depth of the cutout object relative to the people in the group. The user may then select via the user interface to merge the cutout object with the already-captured image, e.g., by selection of a menu item to merge the cutout object with the image. The cutout object may then be merged with the already-captured image so that the cutout object is positioned in the already-captured image as specified by the user. In this way, the photographer may be added to photographs of the trip while post-processing as well as when capturing images of the trip.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example embodiment that is operable to employ techniques described herein. The illustrated environment 100 includes a computing device 102 having a processing system 104 that may include one or more processing devices (e.g., processors), a camera 106, and one or more computer-readable storage media 108. The illustrated environment 100 also includes image content 110, a cutout object library 112, and a cutout merge module 114 embodied on the computer-readable storage media 108 and operable via the processing system 104 to implement corresponding functionality described herein. In at least some embodiments, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a camera (point-and-shoot, single lens reflex (SLR), video recorder, and so on), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The environment 100 further depicts one or more service providers 116, configured to communicate with computing device 102 over a network 118, such as the Internet, to provide a "cloud-based" computing environment. Generally speaking, service providers 116 are configured to make various resources 120 available over the network 118 to clients. In some scenarios, users may sign up for accounts that are employed to access corresponding resources from a provider. The provider may authenticate credentials of a user (e.g., username and password) before granting access to an account and corresponding resources 120. Other resources 120 may be made freely available, (e.g., without authentication or account-based access). The resources 120 can include any suitable combination of services and/or content typically made available over a network by one or more providers. Some examples of services include, but are not limited to, photo editing services, image illustrating services, photo printing services (e.g., Snapfish®, Shutterfly®, and the like), photo storage and/or sharing services Flickr®), social network services (e.g., Facebook®, Twitter®, Instagram®, Hyperlapse®, and the like), and so forth.

These sources may serve as significant amounts of image content. Image content 110 may represent such image content, which may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The cutout object library 112 and the cutout merge module 114 may represent functionality to implement techniques for cutout object merging as described herein. For example, the cutout object library 112 may be configured in various ways to maintain cutout objects that a user can insert into a scene that is capturable by an image capturing device, such as by the camera 106. To populate the cutout object library 112, cutout objects may be extracted from already-captured images. A person, for instance, may be extracted from an already-captured image and used as a cutout object. The cutout object of the person may exclude other people depicted in the already-captured image, background of the image, and so on. In other words, just the person may be taken from the already-captured image and configured as a cutout object. The cutout object may be extracted based on a user-selection of the object in the already-captured image. The portions of the image that are extracted to form the cutout object may be based on a boundary that is determined for the cutout object.

Regardless of how the cutout object library 112 is populated, it may include a variety of cutout objects that a photographer can insert into a scene to be captured. The cutout merge module 114 represents functionality to place a cutout object into a substantially real-time display of the scene before it is captured using the camera 106. The cutout merge module 114 may enable a user to select a cutout object from the cutout object library 112 for insertion into a scene displayed via a user interface, e.g., a user interface configured as a view finder of the camera 106. The user interface may allow the user to drag the cutout object to different locations in the displayed scene and to position the cutout object relative to objects of the scene, e.g., to move the object in front of or behind people in the scene who are viewable in the view finder.

After the cutout object is positioned in the scene, a user may select to capture an image of the scene, e.g., by pressing a button on the computing device 102 that indicates an image is to be captured using the camera 106. The cutout merge module 114 also represents functionality to automatically merge the cutout object with a captured image so that the cutout object is located in the scene as was specified by the user before capturing the image.

The cutout merge module 114 may be implemented as a software module, a hardware device, or using a combination of software, hardware, firmware, fixed logic circuitry, etc. Further, the cutout merge module 114 may be implemented as a standalone component of the computing device 102 as illustrated. In addition or alternatively, the cutout merge module 114 may be configured as a component of an application, an operating system of the computing device 102, a plug-in module, a standalone service or a service integrated with other services, or other device application.

In at least some embodiments, the cutout merge module 114 is configured to operate in connection with content editing applications that may use application-specific and/or proprietary formats. By way of example and not limitation, an application of the computing device 102 may be configured as an image editor application one example of which is Adobe Photoshop®. Other content and image editor applications are also contemplated.

Having considered an example environment, consider now a discussion of some example details of the techniques for cutout object merging in accordance with one or more embodiments.

Cutout Object Merge Details

Figure 2:
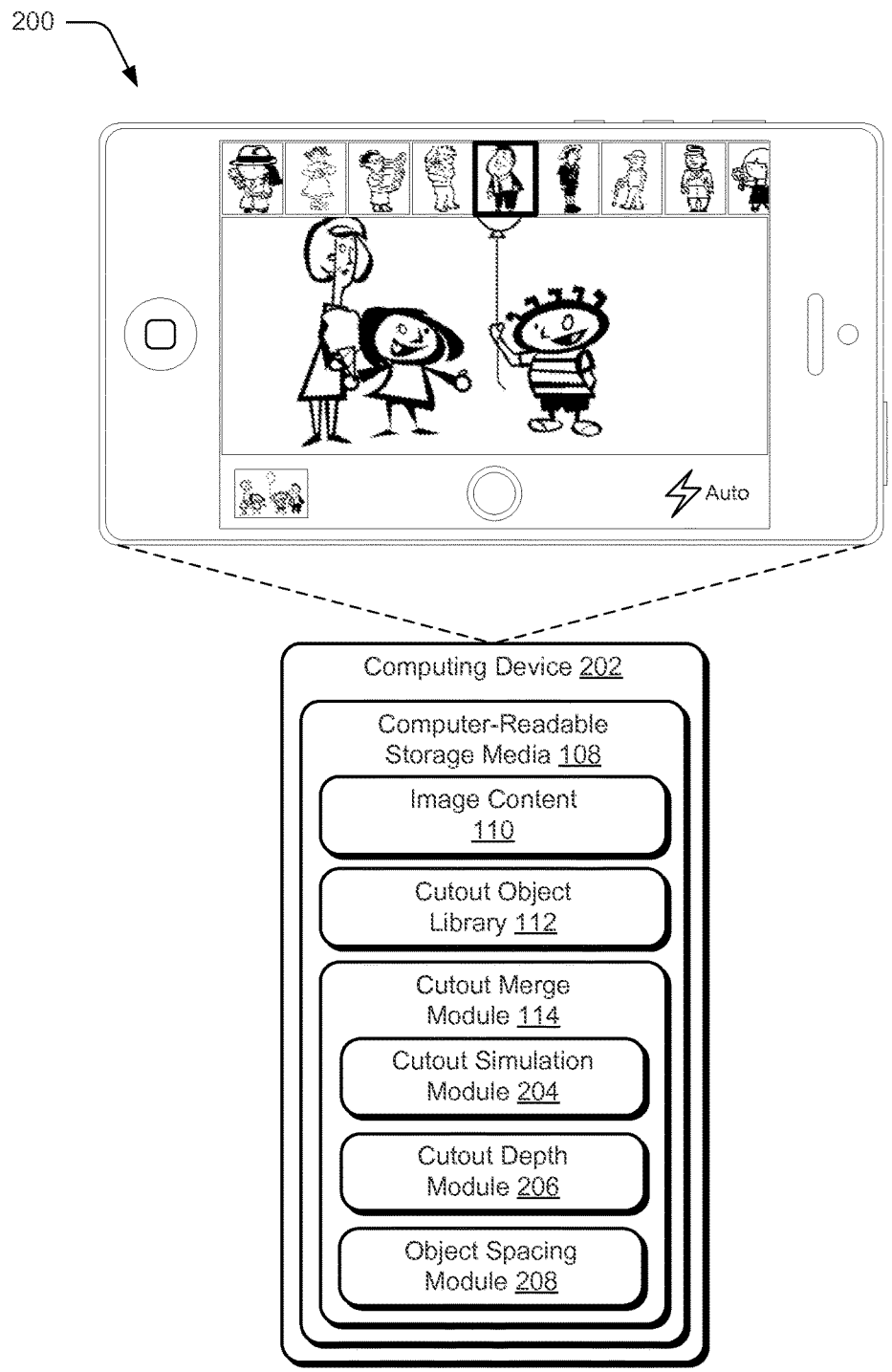
FIG. 2 illustrates portions of the environment from FIG. 1 in greater detail in accordance with one or more embodiments.

This section describes some example details of cutout object merge techniques in accordance with one or more embodiments. FIG. 2 depicts generally at 200 some portions of the environment 100 of FIG. 1, but in greater detail. In particular, the computer-readable storage media 108 and the components included therein are depicted in greater detail.

In FIG. 2, the computer-readable storage media 108 is included as part of computing device 202 and includes the image content 110, the cutout object library 112 and the cutout merge module 114. The cutout merge module 114 is illustrated with a cutout simulation module 204, a cutout depth module 206, and an object spacing module 208. These modules represent functionality of the cutout merge module 114 and it should be appreciated that such functionality may be implemented using more or fewer modules than those illustrated. The discussion of the cutout simulation module 204, the cutout depth module 206, and the object spacing module 208 refers to FIGS. 3-5, which illustrate concepts pertinent to the functionality of those modules.

In general, the cutout merge module 114 may be configured to access cutout objects from the cutout object library 112 for insertion into a substantially real-time display of a scene. The cutout merge module 114 is also configured to merge a cutout object placed in the scene with a captured image of the scene. As discussed above, the cutout objects that are maintained in the cutout object library 112 may be extracted from already-captured images. The cutout objects may be referred to as "cutout" because they each correspond to just a portion of an already-captured image that appears to be cutout from the already-captured image, e.g., as if cutout from a physical photograph with a pair of scissors. As part of extracting an object from an already-captured image, a boundary of the object may be determined. The pixels of the already-captured image within the boundary may be considered part of the object that is to be extracted, while pixels outside the boundary are not.

Regardless of how objects are extracted for use as cutout objects, the techniques described herein may enable a user to simply select an object in an already-captured image for use as a cutout object. The selected object may then be automatically extracted (e.g., cutout) from the already-captured image and added to the cutout object library 112. By way of example and not limitation, a boundary of the selected object may be determined. Regions of the already-captured image that are within the determined boundary may be considered to correspond to the selected object. As such, those regions of the already-captured image may be separated from the rest of the already-captured image and extracted. Other techniques may be used to extract the selected object from the already-captured image without departing from the spirit or scope of the techniques described herein. In any case, cutout objects from the cutout object library 112 may be displayed as part of a user interface associated with taking photographs (e.g., a view finder of the camera 106) and as part of a user interface associated with editing photographs (e.g., a user interface of a photo editing application).

Figure 3:
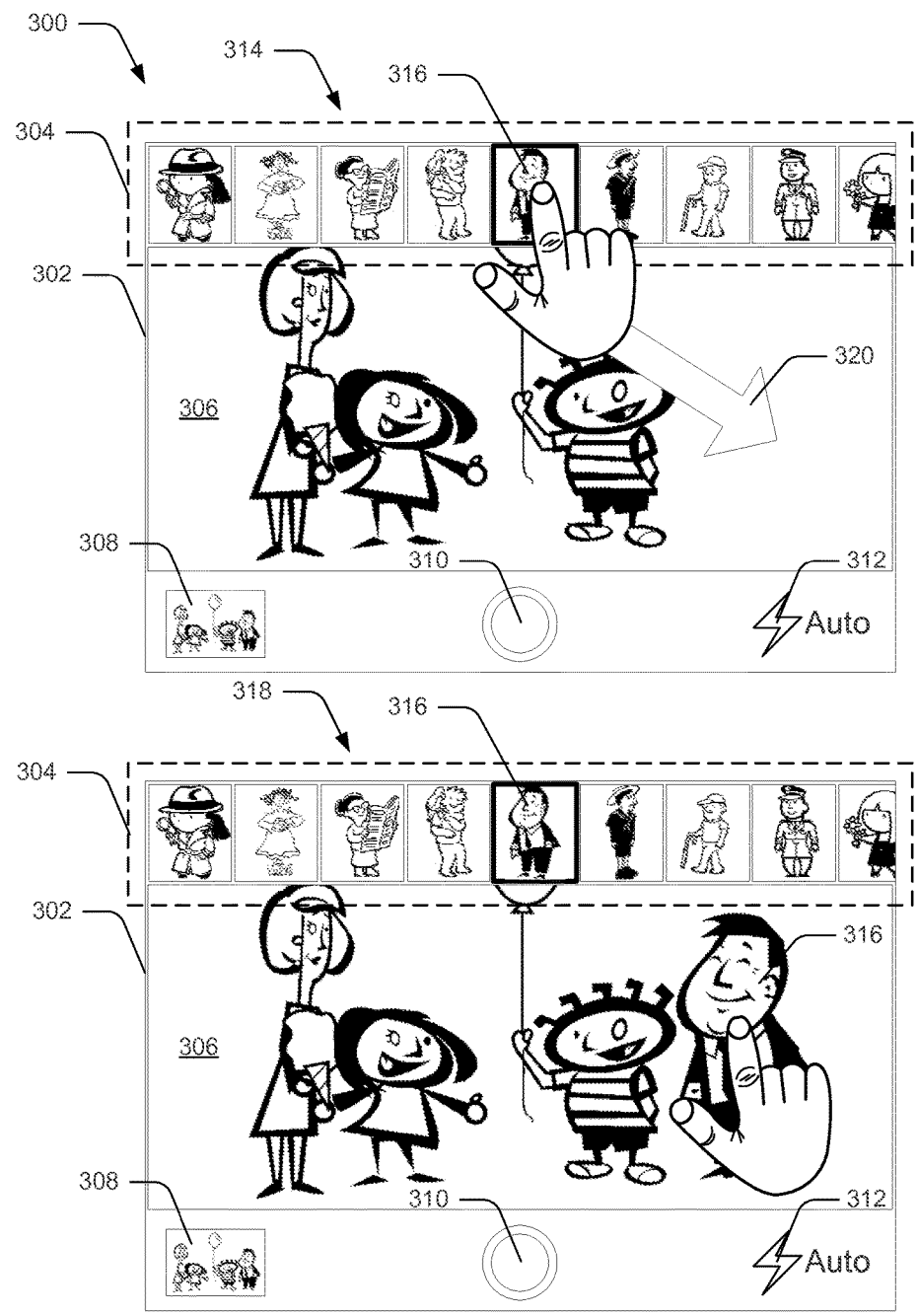
FIG. 3 is an example embodiment showing a cutout object being placed into a substantially real-time display of a scene.

FIG. 3 illustrates at 300 an example in which a cutout object is placed into a substantially real-time display of a scene. In particular, FIG. 3 illustrates a user interface 302 that includes an assortment of cutout objects 304, a view finder 306 capable of displaying a scene substantially in real-time, a representation of a last-captured image 308, a picture-capture button 310, and an indication of a flash setting 312. The assortment of cutout objects 304 may be accessed and then displayed from the cutout object library 112. The depiction of the user interface 302 at 314 represents a scenario in which a user provides input to select a cutout object 316 from the assortment of cutout objects 304. Based on the selection, the cutout merge module 114 may identify the cutout object 316 for insertion into the substantially real-time display of the scene presented in the view finder 306.

The depiction of the user interface 302 at 318 represents a continuation of the scenario represented at 314. In particular, the depiction of the user interface 302 at 318 represents a scenario in which the cutout object 316 selected by the user at 314 is placed in the substantially real-time display of the scene. The cutout merge module 114 may, for instance, enable a user to drag the cutout object 316 onto the substantially real-time display of the scene, which is represented by arrow 320.

In the examples at 314 and 318, the scene presented in substantially real-time via the view finder 306 includes three people. Those three people may, for instance, be standing before a camera having the view finder 306. As the people move, their movement is displayed via the view finder 306 in substantially real-time. While the scene is displayed in substantially real-time (e.g., while the people of the scene are still moving), the cutout merge module 114 enables the cutout object 316 to be placed in the scene. Specifically, the cutout merge module 114 enables the cutout object 316 to be placed relative to the objects in the scene even if those objects continue to move. The cutout object 316 may, for instance, be placed beside the objects of the scene, in front of them, behind them, and so on. In any case, the cutout merge module 114 enables the cutout object 316 to be selected from the assortment of cutout objects 304 and placed among a displayed scene's objects before an image of the scene is captured.

In addition to enabling a user to place the cutout object 316 among objects in a substantially real-time display of a scene, the cutout merge module 114 also represents functionality to adjust the cutout object 316. To do so, the cutout merge module 114 may employ the cutout simulation module 204. The cutout simulation module 204 may be configured to determine what adjustments to make to the cutout object 316 based on the objects of the scene. The cutout simulation module 204 may then adjust the cutout object 316 based on the determination. By way of example and not limitation, the cutout simulation module 204 may determine to adjust a size, brightness, color temperature, and so on, of the cutout object 316. Moreover, the cutout simulation module 204 may make corresponding adjustments to the cutout object 316 before an image of the scene is captured.

With regard to adjusting a size of the cutout object 316, the cutout simulation module 204 may do so based on objects in the scene. The cutout simulation module 204 may, for instance, approximate a size of objects in the scene, and use the approximated size of the objects as a basis for sizing the cutout object 316. Returning to the examples at 314 and 318, the cutout simulation module 204 may base a size of the cutout object 316 on at least one of the three people in the scene. For example, the cutout simulation module 204 may determine an approximate face height of one of the three people in the scene. The cutout simulation module 204 may then adjust a size of the cutout object 316 so that a height of its face matches the approximated face height of the person in the scene.

Using a face height as a basis for adjusting size may be based on an observation that an average height of human faces $H_{avg}$ can be considered almost the same with a small margin of error. The average height of human faces $H_{avg}$ may be determined using a machine learning technique that samples a large number of human faces and calculates heights of those faces. The cutout simulation module 204 may also calculate a face height of the cutout object $H_{cutout}$ and face heights of people in the scene. To calculate a face height of a person in the scene $M_{target}$, the cutout simulation module 204 may use a user-selected face. By way of example, the user may be prompted to select a face of a person in the view finder 306, e.g., with a prompt displayed via the user interface 302 instructing the user to 'Tap a person's face'. Given the face height of the cutout object $H_{cutout}$ and the face height of the person in the scene $H_{target}$, a scale factor $S_f$ may be determined for adjusting the size of the cutout object 316 as follows:

$$S_f = H_{target}/H_{cutout}$$

The scale factor $S_f$ may be indicative of an amount by which the cutout simulation module 204 scales the cutout object 316 so that the height of its face matches the height of the faces in the scene. It is to be appreciated that the cutout simulation module 204 may adjust a size of the cutout object 316 without using face height as a basis for the adjustment. By way of example, the cutout simulation module 204 may adjust the size of the cutout object 316 based on user-entered heights of the people in the scene and a height of the person to which the cutout object 316 corresponds. In addition or alternatively, the cutout simulation module 204 may use a variety of other techniques to automatically adjust a size of the cutout object 316 without user interaction.

As mentioned above, the cutout simulation module 204 also represents functionality to adjust the cutout object 316 in other ways. For example, the cutout simulation module 204 may be configured to adjust visual characteristics of the cutout object 316, such as its brightness, saturation, color temperature, hue, and so forth. The cutout simulation module 204 may do so to match the visual characteristics of the cutout object 316 with the visual characteristics of the scene. The cutout object 316 may have been extracted from an image that was captured under lighting conditions different from those with which the scene displayed via the view finder 306 is lit. Thus, if placed in the scene with unadjusted visual characteristics, the cutout object 316 may not appear as if part of the scene when an image of the scene is captured. By adjusting the visual characteristics of the cutout object 316, however, the cutout object 316 may have a more realistic appearance. In other words, adjusting the visual characteristics of the cutout object 316 to match those of the scene may cause the cutout object 316 to appear as if part of the scene when an image of the scene is captured.

To match the visual characteristics of the cutout object 316 with the visual characteristics of the scene (e.g., brightness, saturation, color temperature, hue, and so forth), the cutout simulation module 204 may compute a mean and a standard deviation of each visual characteristic. In particular, the cutout simulation module 204 may compute a mean M' and standard deviation SD' of the visual characteristic for the cutout object 316, and a mean M" and a standard deviation SD" of the visual characteristic for the scene. The cutout simulation module 204 may then adjust the visual characteristic over each pixel of the cutout object 316 according to the following:

$$C_{output}(i,j)=((C_{input}(i,j)-M')(SD''/SD'))+M''$$

Here the term $C_{input}(i,j)$ represents the not-yet-adjusted value of the i-th, j-th pixel of the cutout object 316 in red, green, blue (RGB) color space, and the term $C_{output}(i,j)$ represents the adjusted value of the i-th, j-th pixel of the cutout object 316 in RGB color space. This adjusting may be performed for each of the visual characteristics. By way of example, the adjusting may be performed according to the expression above to adjust the brightness, then the color temperature, then the saturation, and then the hue of the cutout object 316 to match the brightness, color temperature, saturation, and hue of the scene. Although brightness, color temperature, saturation, and hue are specifically enumerated as the visual characteristics matched, it is to be appreciated that other visual characteristics of the cutout object 316 may be adjusted to match corresponding visual characteristics of the scene without departing from the spirit or the scope of the techniques described herein. It is also to be appreciated that the visual characteristics of the cutout object may be adjusted to match those of the scene in a variety of other ways without departing from the spirit or scope of the described techniques.

Unlike conventional techniques that add objects to images during post-processing, the cutout simulation module 204 is configured to adjust a size and visual characteristics of the cutout object 316 before an image of the scene is captured, e.g., while a user is framing a picture through the view finder, positioning the cutout object in the scene, and so forth. Consider an example in which a photographer is framing a photograph using a mobile device (e.g., mobile phone) that has both a front camera capable of capturing a scene on the other side of the camera from the photographer and a rear camera capable of capturing the photographer. In this scenario, instead of using a cutout object from a cutout object library, a cutout object of the photographer as captured in the rear camera may be placed in scene. Thus, a substantially-real time display of the scene may be presented through the view finder that includes the scene from the front camera and a cutout object of the photographer from the rear camera. Upon selecting to capture the image, the cutout object of the photographer captured using the rear camera may be merged with the scene captured using the front camera. In this way, a composite image may be formed having the scene captured with the front camera and the cutout object captured with the rear camera. It is to be appreciated that the scene may instead be captured with the rear camera and the cutout object captured with the front camera. Thus, the composite image may be formed having the scene captured with the rear camera and the cutout object captured with the front camera. It is also to be appreciated that using the techniques described herein the size and visual characteristics of the rear (or front) camera cutout object (e.g., the photographer) may be adjusted before the images are captured to present the photographer with a preview of a merged image via the view finder.

Nevertheless, the functionality of the cutout simulation module 204 may also be utilized during post-processing. By way of example, a user may select in a photo editing application to add a cutout object from the cutout object library 112 to an already-captured image. The cutout simulation module 204 may then adjust a size of the selected cutout object based on objects in the already-captured image. The cutout simulation module 204 may also adjust visual characteristics (e.g., brightness, saturation, color temperature, and so forth) of the selected cutout object to match visual characteristics of the already captured image. To this extent, the photo editing application may enable the selected cutout object to be placed in the already-captured image and appear as if it were part of the scene captured in the already-captured image.

The cutout merge module 114 also represents functionality to adjust a depth of a cutout object relative to the objects in a scene. In other words, the cutout merge module 114 represents functionality to enable the cutout object to be overlapped by objects in the scene as well as to overlap the objects of the scene. To do so, the cutout merge module 114 may employ the cutout depth module 206. The cutout depth module 206 may be configured to adjust a depth of the cutout object according to user input to change the cutout object's depth. By default (e.g., based on user-defined settings or configuration settings), a cutout object may be placed in a substantially real-time display of a scene so that it is in front of the objects in the scene, e.g., the cutout object overlaps the objects in the scene. However, the cutout depth module 206 may enable a user to move the cutout object behind selected objects in the scene, e.g., so that the selected objects overlap the cutout object. By way of example, the cutout depth module 206 may enable the user to select an object of the scene and designate the cutout to be placed in front of or behind the selected object. In addition or alternately, the cutout depth module 206 may enable a user to select a group of objects of the scene and change a depth of the cutout object so that it appears to be in front of or behind the whole group of objects, e.g., through selection of a 'Send to Back' or 'Bring to Front' control. In this way, the cutout object may be placed in front of some objects in the scene and behind others. The manner in which a depth of the cutout is changed relative to objects of the scene is discussed in further detail below.

It is to be appreciated, that the functionality of the cutout depth module 206 may also be used to change a depth of the objects in the scene. By way of example, if a cutout object is placed in front of the objects of the scene, the cutout depth module 206 may enable a user to select an object of the scene and designate that the selected object be moved forward, e.g., so that it is in front of the cutout object placed in the scene.

Figure 4:
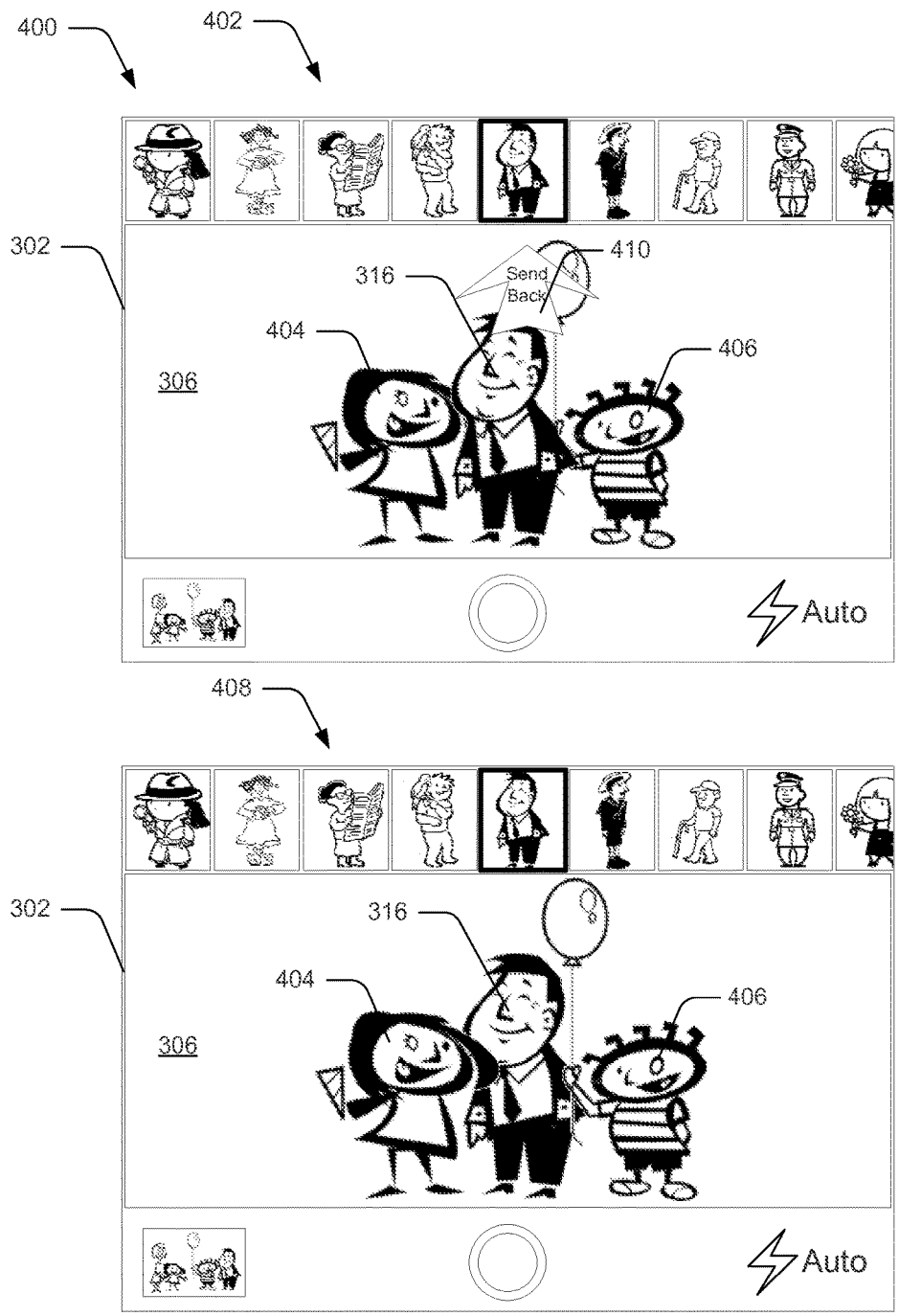
FIG. 4 is an example embodiment showing a depth of a cutout object placed in a substantially real-time display of a scene being changed relative to objects in the scene.

FIG. 4 illustrates at 400 an example in which a depth of a cutout object placed in a scene is changed relative to objects in the scene. FIG. 4 also includes the user interface 302 of FIG. 3 having the view finder 306, and depicts that the cutout object 316 has been selected for insertion into the scene displayed in the view finder 306.

The depiction of the user interface 302 at 402 represents a scenario in which the cutout object 316 has already been placed in the scene. The scene that is actually before the camera, and presented via the view finder 306 substantially in real-time, may include just two people, e.g., girl 404 and boy 406. When placed in the scene, the cutout object 316 may have been placed by default in front of the objects in the scene. In this example, the cutout object 316 may have been placed in front of the girl 404 and the boy 406. Using the functionality of the cutout depth module 206, however, the cutout object 316 may be moved behind the objects of the scene.

The depiction of the user interface 302 at 408 represents a continuation of the scenario represented at 402. In particular, the depiction of the user interface 302 at 408 represents a scenario in which a depth of the cutout object 316 has been changed to place it behind objects of the scene. In particular, the cutout object 316 has been placed in the view finder 306 behind the girl 404 and the boy 406. This depth change of the cutout object 316, relative to the girl 404 and boy 406, may have been performed responsive to selection of 'Send Back' control 410. The 'Send Back' control 410 may be displayed as part of the user interface 302 automatically, such as when the cutout object 316 is placed in the view finder 306. The 'Send Back' control 410 may also be displayed responsive to a selection of the cutout object 316 after it is initially placed, responsive to a user selection to change a depth of the cutout object via a menu, and so forth. It is to be appreciated that instead of the 'Send Back' control 410, a 'Bring Forward' control may be displayed responsive to similar events, e.g., automatically when the cutout object is placed in the view finder 306, and so on.

The cutout depth module 206 represents functionality to change a depth of a cutout object relative to objects in a scene in a variety of ways. For example, the cutout depth module 206 may enable a user to select multiple objects in the view finder 306 and designate those objects as foreground. With reference to FIG. 4, for instance, the cutout depth module 206 may enable a user to select the girl 404 and boy 406 and designate them as foreground objects. The cutout depth module 206 may then move the girl 404 and boy 406 to the foreground, e.g., in front of the cutout object 316.

In conjunction with moving the cutout object 316 behind the objects of the scene designated as foreground, the cutout depth module 206 may also create a binary mask for the objects designated as foreground. The binary mask may be created, for instance, with 0's except for the regions selected by the user as foreground, e.g., the girl 404 and boy 406 in this example. Those selected regions may instead be represented in the binary mask by 1's. In addition, the cutout depth module 206 may generate a z-order list that specifies a depth of binary masks, cutout objects, and so on. Thus, the cutout object 316 may be placed according to the z-order list behind a binary mask corresponding to the girl 404 and boy 406. By doing so, the cutout object 316 may appear behind the objects of the scene, as at 408. The binary masks and the z-order lists generated by the cutout depth module 206 may eventually be used in conjunction with merging the cutout object with a captured image of the scene.

In any case, the cutout depth module 206 is configured to adjust a depth of the cutout object before an image of the scene is captured, e.g., while a user is framing a picture through the view finder, positioning the cutout object in the scene, and so forth. Nevertheless, the functionality of the cutout depth module 206 may also be utilized during post-processing. By way of example, a user may select in a photo editing application to add a cutout object from the cutout object library 112 to an already-captured image. The cutout depth module 206 may then adjust a depth of the cutout object relative to objects in the already-captured image. The cutout depth module 206 may do so according to user input to move the cutout object back or forward, designate the cutout object or objects in the scene as foreground or background, and so on. To this extent, the photo editing application may enable a depth of a cutout object to be changed relative to objects in an already-captured image.

The cutout merge module 114 also represents functionality to move objects of a scene depicted substantially in real-time to fit a cutout object into the scene, e.g., so that the cutout object and the objects of the scene do not overlap. To do so, the cutout merge module 114 may employ the object spacing module 208. The object spacing module 208 may be configured to automatically move objects of a scene depicted substantially in real-time based on placement of a cutout object into the scene. By way of example, when a user drags a cutout object among a group of people in a scene, the object spacing module 208 may space one or more of the people in the group apart to make room in the scene for the cutout object. When doing so, however, the object spacing module 208 may be configured to generally maintain the scene displayed substantially in real time. In the group example, for instance, the object spacing module 208 may space out people in the group, but may leave structural aspects of the scene (e.g., streets, signs, buildings, railings, and so on) alone. In other words, the object spacing module 208 may cause some objects in the scene to be moved but not others.

Figure 5:
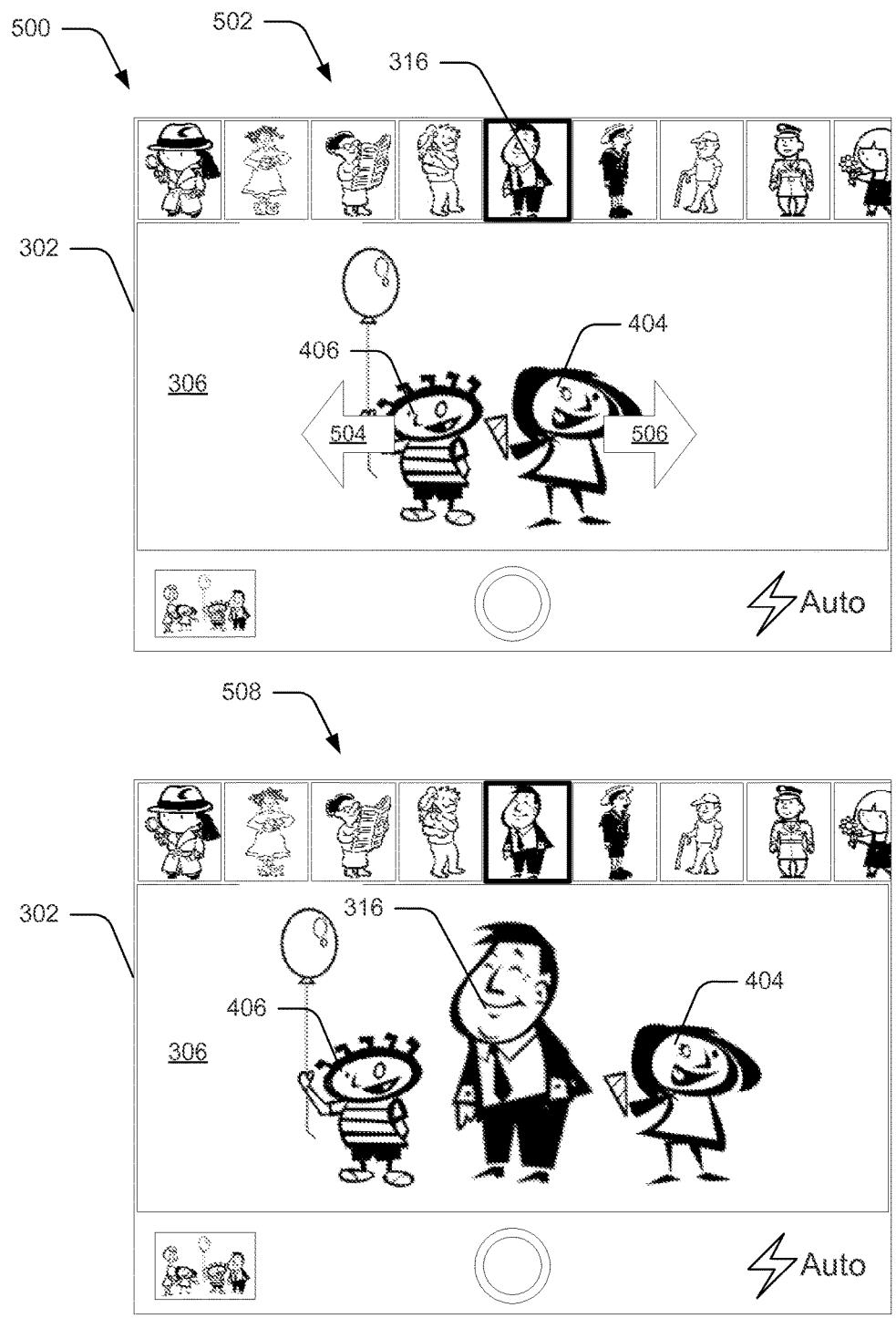
FIG. 5 is an example embodiment showing objects in a scene being moved in a substantially real-time display of the scene to fit a cutout object into the scene.

FIG. 5 illustrates at 500 an example in which objects in a scene are moved in a substantially real-time display of the scene to fit a cutout object into the scene. Like FIG. 4, FIG. 5 includes the user interface 302 of FIG. 3 having the view finder 306 and depicts that the cutout object has been selected for insertion into the scene displayed in the view finder 306. Also like in FIG. 4, the scene actually before the camera and presented via the view finder 306 may include just two people, e.g., the girl 404 and the boy 406, although positioned differently.

The depiction of the user interface 302 at 502 represents a scenario in which the cutout object 316 has been selected for insertion into the scene presented in the view finder 306, but has not yet been placed therein. The arrows 504, 506 represent functionality of the object spacing module 208 to move objects in the scene to make room for the cutout object 316. In this particular example, the arrows 504, 506 represent the functionality of the object spacing module 208 to move the girl 404 and the boy 406 to fit the cutout object 316.

The object spacing module 208 may be configured to move objects in a scene to fit the cutout object 316 responsive to identification of the cutout object 316 for insertion into the scene. In addition or alternately, the object spacing module 208 may be configured to move objects in the scene to fit the cutout object 316 based on a user selection to make room for the cutout object, e.g., selection of a 'Fit Cutout' control (not shown). Still further, the object spacing module 208 may be configured to move objects in a scene based on selection of a 'Fit Cutout' mode. When in a 'Fit Cutout' mode, the object spacing module 208 may enable a user to drag the cutout object throughout the view finder 306. As the user is doing so, the object spacing module 208 may cause various objects in the scene to be moved to fit the cutout object 316, e.g., by snapping objects apart as the cutout object is moved near a space between those objects.

The depiction of the user interface 302 at 508 represents a continuation of the scenario represented at 502. In particular, the depiction of the user interface 302 at 508 represents a scenario in which the cutout object 316 has been placed in the scene and in which objects in that scene have been moved. In this particular example, the boy 406 has been moved to the left and the girl 404 to the right to fit the cutout object 316 between them.

To move the objects of a scene to fit a cutout object, the object spacing module 208 may compute an energy map of the scene presented in the view finder 306. The energy map computed may be used by the object spacing module 208 as a gradient map to identify least energy seams (e.g., paths) in the scene. In general, the gradient map may measure areas in which pixel values have a high change relative to one another. The object spacing module 208 may define the gradient ∇f according to the following:

$$\nabla f = \frac{\partial f}{\partial x}\hat{x} + \frac{\partial f}{\partial y}\hat{y}$$

In this equation the term $$\frac{\partial f}{\partial x}$$

represents a gradient in the x-direction and the term $$\frac{\partial f}{\partial y}$$

represents a gradient in the y-direction. Further, the object spacing module 208 is configured to increase a size of the scene (in terms of columns of pixels) by a same number of pixels as columns the cutout object inserted in the scene is wide. To resize the scene, the object spacing module 208 adds pixels into the scene beside seams having least energies according to the gradient map.

In any case, the object spacing module 208 is configured to space objects in an image to fit a cutout object before an image of the scene is capture, e.g., while a user is framing a picture through the view finder, positioning the cutout object in the scene, and so forth. Nevertheless, the functionality of the object spacing module 208 may also be utilized during post-processing. By way of example, a user may select in a photo editing application to add a cutout object from the cutout object library 112 to an already-captured image. The object spacing module 208 may then move objects in the already-captured image to fit the cutout object. To this extent, the photo editing application may enable objects in an already-captured image to be moved to make space for a cutout object.

Once a user has placed a cutout object into a scene displayed substantially in real-time, the user may select to capture an image of the scene. By way of example, the user may select the picture-capture button 310 to capture an image of the scene. Responsive to selection of the picture-capture button 310 and capturing the image of the scene, the cutout merge module 114 may be configured to merge the cutout object 316 with the captured image to form a composite image. The composite image may include the cutout object 316 in the scene at the location specified by the user. Additionally, the cutout object 316, as included in the composite image, may have had its size and visual characteristics adjusted by the cutout simulation module 204. The cutout depth module 206 may enable the cutout object 316 to be placed in the composite image behind objects captured from the scene. Further, the object spacing module 208 may enable objects of the scene to be moved so that in the composite image the cutout object 316 fits. In other words, the cutout object 316 may be incorporated into the captured image so that it appears as if part of the scene when the image was captured. Moreover, the composite image may correspond to the information that was presented via the view finder 306 at a time the picture-capture button 310 was selected.

The merging of the cutout object 316 with the captured image may be performed automatically by the cutout merge module 114. In one or more embodiments, the result of the image capture and merge may be a single image file, e.g., the composite image file. Alternately the result of the image capture and merge may be more than one file, e.g., a file corresponding to the captured image and a file corresponding to the composite image file. In any case, the one or more image files may be maintained as part of the image content 110. In this way, these files may be accessed from the image content 110 for further viewing or editing, e.g., by a photo editing application. As noted above, the functionality of the cutout simulation module 204, the cutout depth module 206, and the object spacing module 208 may be utilized during post-processing as well as prior to capturing an image of a scene.

Having discussed example details of the cutout object merge techniques, consider now some example procedures to illustrate additional aspects of the techniques.

Example Procedures

This section describes example procedures for cutout object merge techniques in one or more embodiments. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as example computing devices 102, 202 of FIGS. 1 and 2 that make use of a cutout merge module 114.

Figure 6:
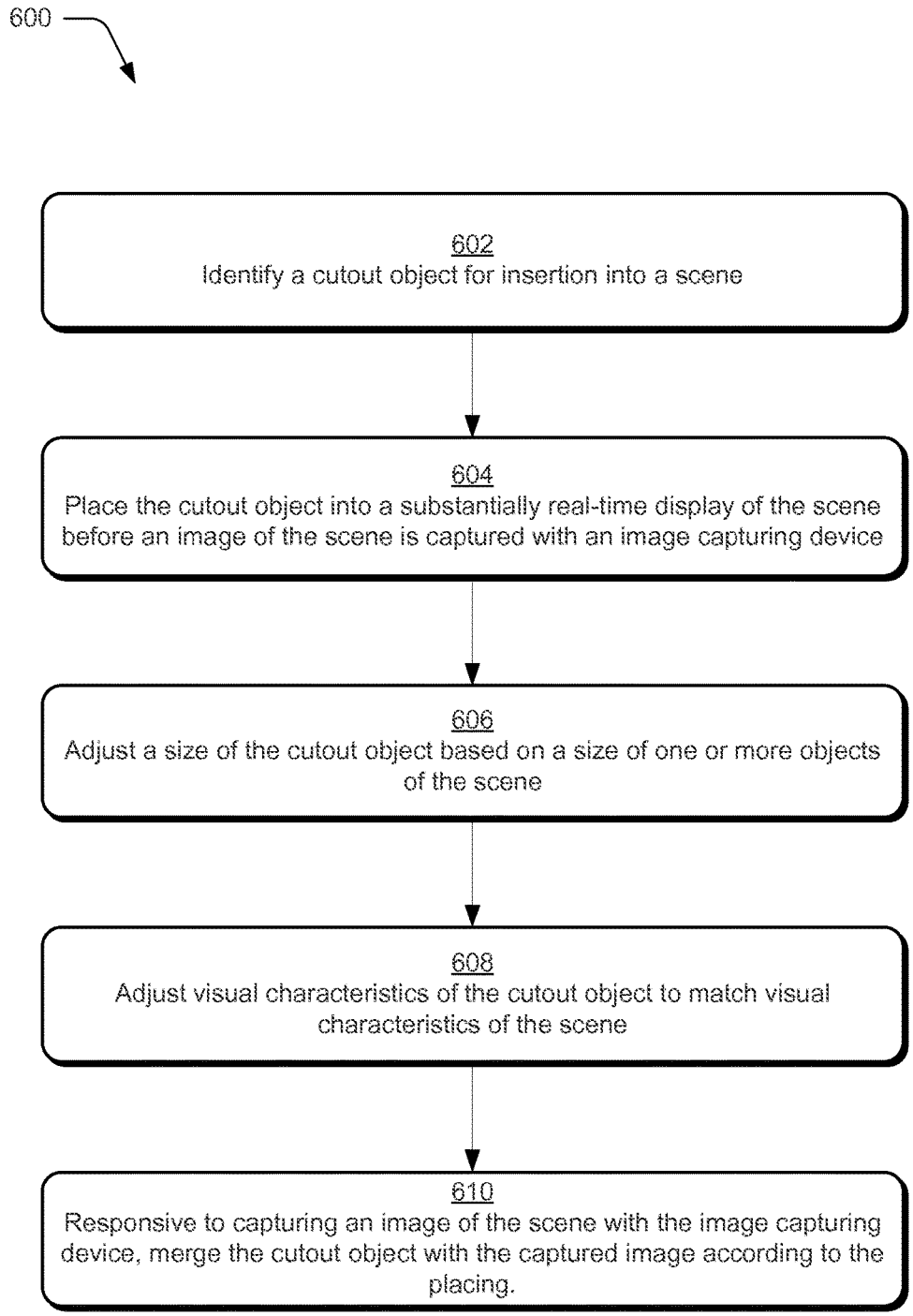
FIG. 6 is a flow diagram depicting an example procedure in accordance with one or more embodiments.

FIG. 6 depicts an example procedure 600 in which a cutout object is placed into a substantially real-time display of a scene and, once an image of the scene is captured, merged with the captured image to form a composite image. First, a cutout object is identified for insertion into a scene (block 602). By way of example, a user selection is received via user interface 302 of the cutout object 316 from the assortment of cutout objects 304. The assortment of cutout objects 304 that are displayed for user selection via the user interface 302 may comprise a subset or entirety of the cutout objects available via the cutout object library 112. The cutout object library 112 may be included as part of a same device as the camera 106. In addition or alternately, the cutout object library 112 may be remote from the device that includes the camera 106, but may be accessible to that device, e.g., over a wireless connection, cellular connection, Bluetooth™ connection, and so on.

Before an image of the scene is captured with an image sensing device, the cutout object is placed into a substantially real-time display of the scene (block 604). For example, the cutout object 316 is placed into a substantially real-time display of a scene presented in the view finder 306. The cutout merge module 114 may enable a user to drag the cutout object 316 through a scene presented in the view finder 306 in substantially real-time. When the user is finished performing the dragging, the cutout merge module 114 may place the cutout object 316 at the location in the scene where the dragging stopped. In other words, the cutout merge module 114 may place the cutout object at a location specified by a user. In one or more embodiments, the cutout merge module 114 may automatically place the cutout object 316 in the scene displayed via the view finder 306 responsive to the user selection of the cutout object 316 from the assortment of cutout objects 304. Once the cutout object 316 is placed in this manner, the cutout merge module 114 may enable the user to change the placement of the cutout object 316, e.g., by dragging the cutout object 316 throughout the scene.

In addition to enabling the cutout object 316 to be dragged throughout a scene (e.g., to change x and y coordinates of the cutout object 316), the cutout merge module 114 may also enable a depth of the cutout object 316 to be changed (e.g., to change z coordinates of the cutout object 316 relative to objects in the scene). To do so, controls may be presented that enable the user to adjust a depth of the cutout object, such as controls to 'Send Back', 'Send to Back', 'Bring Forward', 'Bring to Front,' and so on.

A size of the cutout object is adjusted based on a size of one or more objects of the scene (block 606). For example, the cutout simulation module 204 may adjust a size of the cutout object 316 based on a size of objects in the scene displayed substantially in real time via the view finder 306. When the cutout object 316 corresponds to a person, as in FIGS. 3-5 for instance, the cutout simulation module 204 may adjust a size of the cutout object 316 based on face heights of one or more people in the scene. The cutout simulation module 204 may adjust the size of the cutout object 316 in yet other manners without departing from the spirit or scope of the techniques described herein. In any case, the cutout simulation module 204 may adjust the size of the cutout object 316 automatically and without receiving user input to adjust the size, e.g., in response to placement of the cutout object 316. The cutout simulation module 204 may adjust the size of the cutout object 316 before an image of the scene displayed in the view finder 306 is captured.

Visual characteristics of the cutout object are adjusted to match visual characteristics of the scene (block 608). For example, the cutout simulation module 204 may adjust visual characteristics (e.g., brightness, saturation, color temperature, and so on) of the cutout object 316 to match the visual characteristics of the scene that is presented in the view finder 306. Moreover, the cutout simulation module 204 may do so before an image of the scene is captured, e.g., while a user is framing a scene in the user interface 302, placing the cutout object 316 at a location in the scene, and so on.

Responsive to capturing an image of the scene with an image capturing device, the cutout object is merged with the captured image at a location in the scene specified by the placing (block 610). For example, a user may select the picture-capture button 310 to capture the scene presented substantially in real-time via the view finder 306. Responsive to this selection, an image of the scene is captured using the camera 106. The cutout merge module 114 may then merge the cutout object 316 with the captured image of the scene. In particular, the cutout merge module 114 may incorporate the cutout object 316 into the captured image at a location of the scene, as specified at block 604. The cutout merge module 114 may also incorporate the cutout object into the captured image having the adjusted size, e.g., as at block 606, and the adjusted visual characteristics, e.g., as at block 608. The composite image may thus be the result of merging the cutout object 316 with the captured image of the scene.

Figure 7:
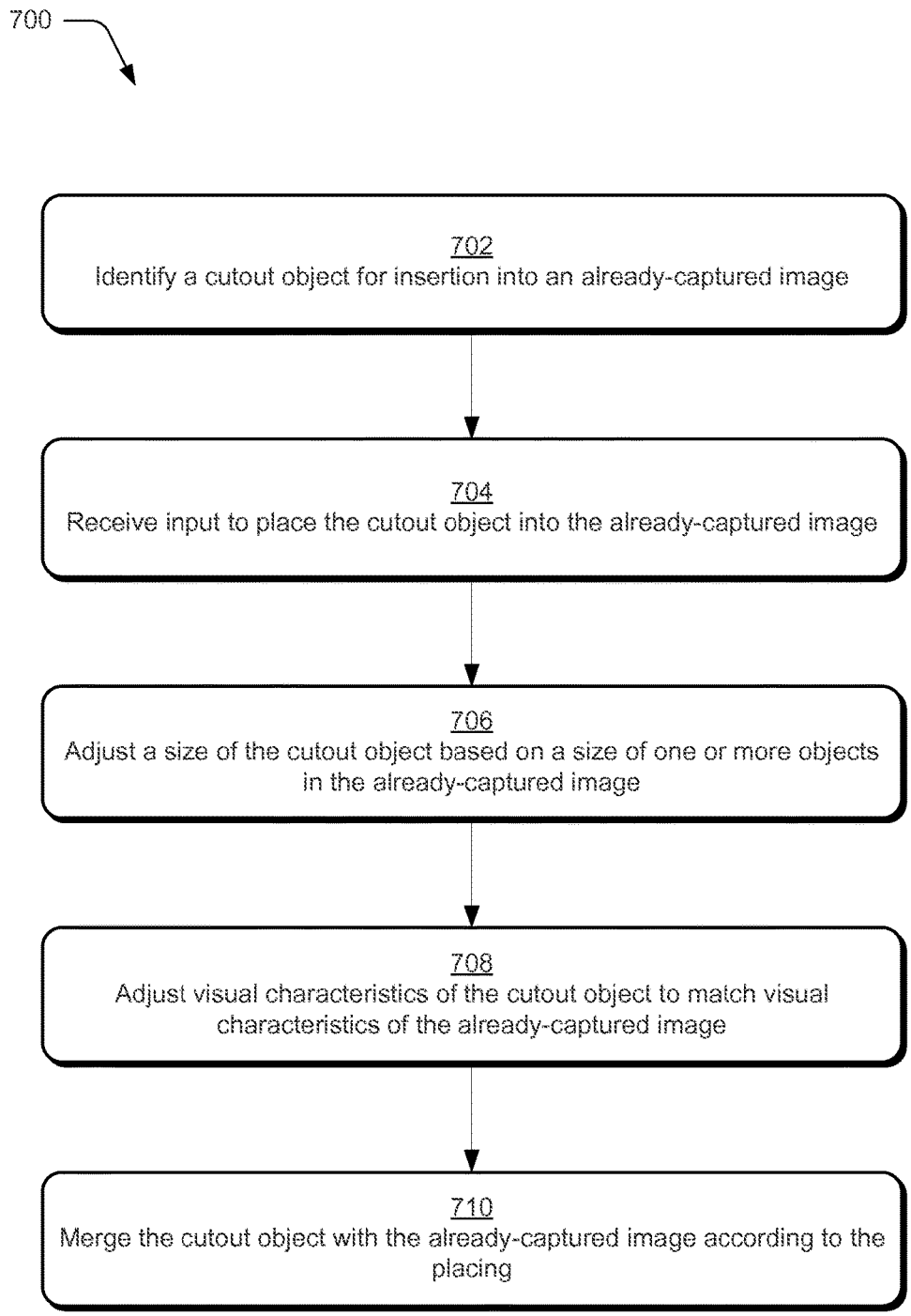
FIG. 7 is a flow diagram depicting another example procedure in accordance with one or more embodiments.

FIG. 7 depicts an example procedure 700 in which a cutout object is placed into an already-captured image and merged with the already-captured image to form a composite image. First, a cutout object is identified for insertion into the already-captured image (block 702). By way of example, a user selection is received via a user interface of a photo editing application of the cutout object 316 from the assortment of cutout objects 304, which may comprise a subset or entirety of the cutout objects available via the cutout object library 112.

Input is received to place the cutout object into the already captured image (block 704). For example, the cutout object 316 is placed into an already-captured image of a scene presented via a user interface of a photo editing application. The cutout merge module 114 may enable a user to drag the cutout object 316 through the already-captured image. When the user is finished performing the dragging, the cutout merge module 114 may place the cutout object 316 at the location in the already-captured image where the dragging stopped. In other words, the cutout merge module 114 may place the cutout object at a location specified by a user.

In addition to enabling the cutout object 316 to be dragged throughout the already-captured image (e.g., to change x and y coordinates of the cutout object 316), the cutout merge module 114 may also enable a depth of the cutout object 316 to be changed (e.g., to change z coordinates of the cutout object 316 relative to objects in the already-captured image). To do so, controls may be presented that enable the user to adjust a depth of the cutout object, such as controls to 'Send Back', 'Send to Back', 'Bring Forward', 'Bring to Front,' and so on.

A size of the cutout object is adjusted based on a size of one or more objects of the already-captured image (block 706). For example, the cutout simulation module 204 may adjust a size of the cutout object 316 based on a size of objects in the already-captured image. When the cutout object 316 corresponds to a person, the cutout simulation module 204 may adjust a size of the cutout object 316 based on face heights of one or more people in the already-captured image. In any case, the cutout simulation module 204 may adjust the size of the cutout object 316 automatically and without receiving user input to adjust the size, e.g., in response to mere placement of the cutout object 316 in the already captured image.

Visual characteristics of the cutout object are adjusted to match visual characteristics of the already-captured image (block 708). For example, the cutout simulation module 204 may adjust visual characteristics (e.g., brightness, saturation, color temperature, and so on) of the cutout object 316 to match the visual characteristics of the already-captured image. Moreover, the cutout simulation module 204 may do so in response to mere placement of the cutout object 316 in the already captured image.

Responsive to receiving a selection to merge the cutout object with the already-captured image, the cutout object is merged with the already-captured image at a location in the scene specified by the placing (block 710). For example, a user may select a menu option from a photo editing application to merge the cutout object with the already-captured image. In addition or alternately, the cutout object may be merged with the already-captured image automatically to form a composite image, such as automatically in response to placement of the cutout object within the already-captured image. In any case, the cutout merge module 114 may incorporate the cutout object 316 into the already-captured image at the location specified at block 704. The cutout merge module 114 may also incorporate the cutout object into the already-captured image having the adjusted size, e.g., as at block 706, and the adjusted visual characteristics, e.g., as at block 708. The composite image may thus be the result of merging the cutout object 316 with the already-captured image of the scene.

Having described example procedures in accordance with one or more embodiments, consider now an example system and device that can be utilized to implement the various techniques described herein.

Example System and Device

Figure 8:
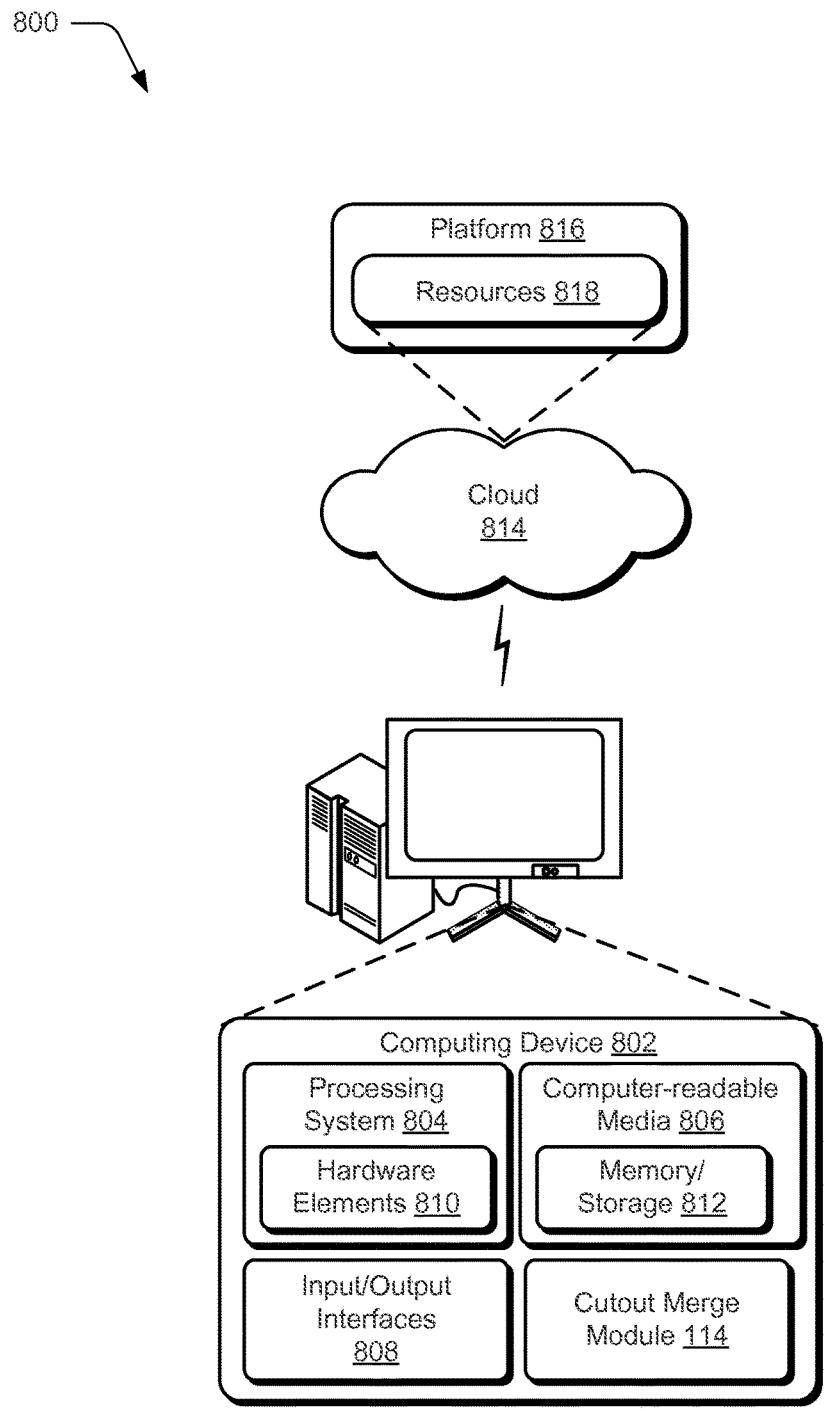
FIG. 8 illustrates an example system including various components of an example device that can be employed for one or more embodiments of cutout object merging described herein.

FIG. 8 illustrates an example system generally at 800 that includes an example computing device 802 that is representative of one or more computing systems and/or devices that may implement the various techniques described herein. This is illustrated through inclusion of the cutout merge module 114, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    identifying a cutout object of a person for insertion into a scene;
    responsive to user input to insert the cutout object into a substantially real-time display of the scene, displaying a substantially real-time preview of the scene having the cutout object by:
        placing the cutout object into the substantially real-time display of the scene before capturing an image of the scene;
        adjusting, before capturing the image of the scene, a size of the cutout object in the substantially real-time display of the scene based on a height of the person's face relative to an approximated size of one or more objects in the scene;
        adjusting, before capturing the image of the scene, visual characteristics of the cutout object placed in the substantially real-time display of the scene by matching the visual characteristics of the cutout object to visual characteristics of the scene; and
        adjusting, before capturing the image of the scene, spacing of at least one object in the scene relative to the cutout object by moving the at least one object in the scene to fit the cutout object;
    capturing the image of the scene with an image capturing device according to the preview and responsive to a user input to initiate the capturing; and
    merging the cutout object with the captured image according to the placing.

2. A method as described in claim 1, wherein the cutout object is identified for insertion from a library of cutout objects.

3. A method as described in claim 1, further comprising placing the cutout object into the substantially real-time display of the scene relative to the one or more objects of the scene.

4. A method as described in claim 1, further comprising sending the cutout object behind the one or more objects of the scene in the substantially real-time display of the scene so that the one or more objects of the scene overlap the cutout object, and the cutout object being merged with the captured image behind the one or more objects of the scene.

5. A method as described in claim 1, further comprising sending the cutout object behind the one or more objects of the scene after the captured image is captured so that the one or more objects of the scene overlap the cutout object, the cutout object being merged with the captured image behind the one or more objects of the scene.

6. A method as described in claim 1, wherein the size of the cutout is further adjusted based on face height of one or more people in the scene.

7. A method as described in claim 1, further comprising further adjusting the size of the cutout object based on a size of one or more objects in the captured image, the cutout object with the adjusted size being merged with the captured image.

8. A method as described in claim 1, further comprising merging the cutout object having the adjusted visual characteristics with the captured image.

9. A method as described in claim 1, wherein adjusting the visual characteristics of the cutout object includes:
    calculating a mean and standard deviation for each of the visual characteristics of the scene and each of the visual characteristics of the cutout object; and
    computing adjusted visual characteristic values for pixels of the cutout object based on the calculated means and standard deviations.

10. A method as described in claim 1, further comprising:
    receiving selection of an object in the scene relative to which the cutout object is to be placed; and adjusting a placement of the selected object in the substantially real-time display of the scene to fit the cutout object so that the cutout object and the selected object do not overlap, the adjusted placement of the selected object being imposed in conjunction with merging the cutout object with the captured image.

11. A method as described in claim 1, further comprising:
receiving, after the captured image is captured, selection of one or more objects in the captured image relative to which the cutout object is to be placed; and
adjusting a placement of the selected one or more objects to fit the cutout object so that the cutout object and the selected one or more objects do not overlap, the adjusted placement of the selected one or more objects being imposed in conjunction with merging the cutout object with the captured image.

12. A method as described in claim 1, wherein the displaying the substantially real-time preview of the scene having the cutout object further comprises displaying the one or more objects of the scene with the cutout object as the one or more objects of the scene are moving.

13. A method as described in claim 1, wherein the one or more objects of the scene include one or more additional human faces in the scene, and wherein the adjusting the size of the cutout object further comprises selecting a subset of the one or more additional human faces and adjusting the size of the cutout object based on the height of the person's face relative to an approximated size of the subset of the one or more additional human faces.

14. A method as described in claim 1, wherein the cutout object is captured in substantially-real time by an additional image capture device for input into the substantially real-time preview of the scene.

15. A system comprising:
a library of cutout objects, each of which has been extracted from an already-captured image; and
a cutout merge module implemented at least partially in hardware, the cutout merge module configured to perform operations responsive to user input to position a selected cutout object in a scene being displayed substantially in real-time by a display device, the operations comprising:
placing, before an image is captured, the selected cutout object into the scene according to the user input;
determining at least one of brightness, saturation, or hue of one or more objects in the scene and the selected cutout object;
calculating a first mean and standard deviation for the determined brightness, saturation, or hue of the one or more objects in the scene;
calculating a second mean and standard deviation for the determined brightness, saturation, or hue of the selected cutout object;
adjusting, before the image is captured, the determined brightness, saturation, or hue of the selected cutout object based on the first and second means and standard deviations, the adjusted brightness, saturation, or hue being applied to the selected cutout object placed in the substantially real-time display of the scene;
capturing the image of the scene responsive to a user input to initiate the capturing; and
generating a composite image of the scene by merging the selected cutout object with the captured image of the scene so that the selected cutout object is incorporated into the scene according to the placing and the adjusting.

16. A system as described in claim 15, wherein the display device comprises a view finder for an image capturing device and the substantially real-time display of the scene comprises a preview of an image of the scene that is to be captured with the image capturing device.

17. A system as described in claim 15, wherein the generating is performed responsive to receiving the user input to capture the image of the scene.

18. A method implemented by a computing device, the method comprising:
automatically adjusting, before an image is captured, a size of a cutout object that is placed into a scene based on a size of one or more objects of the scene;
adjusting, before the image is captured, a depth in the scene of the cutout object according to input that specifies the depth relative to the one or more objects;
determining average values and standard deviations for visual characteristics of the scene;
automatically matching, before the image is captured, visual characteristics of the cutout object to the visual characteristics of the scene by adjusting values for the visual characteristics of the cutout object based on the average values and the standard deviations for the visual characteristics of the scene; and
merging the cutout object, having the adjusted size, the adjusted depth, and the matched visual characteristics, with the image of the scene to form a composite image of the scene that includes the cutout object at a location of the scene at which the cutout object was placed.

19. A method as described in claim 18, further comprising:
receiving selection of an already-captured image that includes the cutout object; and
responsive to selection of the cutout object in the already-captured image, extracting the cutout object from the already-captured image.

20. A method as described in claim 18, wherein the visual characteristics of the cutout object that are matched to the visual characteristics of the scene include at least one of:
brightness of the cutout object;
color temperature of the cutout object;
saturation of the cutout object; or
hue of the cutout object.

* * * * *